April 15, 1947. G. D. MARCY 2,418,976
METHOD AND APPARATUS FOR VULCANIZING STRIP MATERIAL
Filed Nov. 16, 1944 2 Sheets-Sheet 1

Inventor:
Grosvenor D. Marcy,
by Kenway & Witter
Attorney

April 15, 1947.   G. D. MARCY   2,418,976
METHOD AND APPARATUS FOR VULCANIZING STRIP MATERIAL
Filed Nov. 16, 1944   2 Sheets-Sheet 2

Inventor:
Grosvenor D. Marcy,
by Kenway & Witter
Attorneys

Patented Apr. 15, 1947

2,418,976

UNITED STATES PATENT OFFICE 2,418,976

METHOD AND APPARATUS FOR VULCANIZING STRIP MATERIAL

Grosvenor D. Marcy, Newton Highlands, Mass., assignor to Boston Woven Hose & Rubber Company, Cambridge, Mass., a corporation of Massachusetts Application November 16, 1944, Serial No. 563,671

8 Claims. (Cl. 18—6)

This invention relates to methods and apparatus for vulcanizing strip material under pressure and particularly concerns an improvement in the method and apparatus disclosed in Patent 2,179,443 to John M. Bierer. That patent illustrates and describes the continuous vulcanizing of belting constructed of several plies of fabric covered on both faces and both edges with rubber, and the method employed consists in starting with uncured belting of a width greater than the width of the cured belting and feeding such uncured belting into a continuous trough-like molding channel having a bottom wall and side walls and of a width corresponding to the finished belting to be produced. The relatively wider uncured belting is forced into the channel by bending its marginal portions inwardly and feeding them into the channel in advance of the intermediate portion of the belting therebetween. The marginal portions of the belting are thus bent inwardly by passing the belting over a roll disposed adjacent to the channel and having conical end portions tapering outwardly to greater diameter and cooperating with the side walls of the channel and adapted to engage and bend the marginal portions of the belting inwardly and feed them into the channel.

Figure 1:
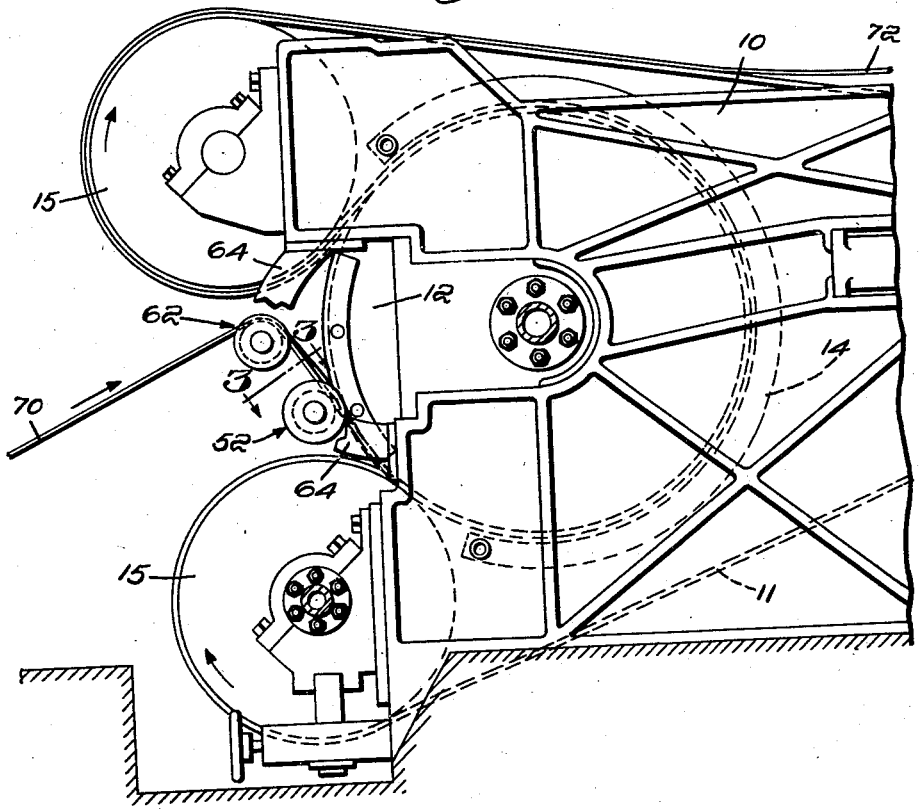

As described in said patent, it is desirable that the belting shall be vulcanized under a condition of predetermined tension and for this purpose the uncured belting is stretched and tensioned, as by rolls 46 illustrated in Fig. 1 of the patent, and from thence it is passed over the above defined roll which bends the marginal portions and feeds them into the vulcanizing channel. It will be apparent that in passing around the roll the marginal portions of the belting, which engage the relatively larger conical ends of the roll, are stretched to a substantially greater length than is the intermediate portion of the belting and, furthermore, the belting is bowed both longitudinally and transversely as it passes about the roll. This action not only defeats the maintenance of uniform tension in the belting but the severe flexing of the belting in two directions while held under tension tends to cause relative shifting movement between the plies of the fabric and results in the formation of blisters and ply separation in the final product. This is particularly likely to occur in belts made with synthetic compounds in which it is more difficult to make the plies adhere strongly than in the case of natural rubber. I have discovered that this fault results from the passing of the belting through a substantial arcuate path of about 90° over the said roll and wherein the belting is deflected in two directions longitudinally and transversely, and a primary object of my invention resides in the production of an improved method and apparatus which will remedy the same.

A further difficulty that sometimes occurs in the procedure described in said patent is that the two edges of portions of the belting are not adequately covered with rubber nor finished uniformly. I have found that this defect in the formly. I have found that the roll with its product is due to the fact that the roll with its conical ends is insufficient to keep the belting properly centered with the result that one edge will have insufficient stock and finish while the other edge will have a surplus of stock and finish. Such result is particularly objectionable in conveyor belting which is especially subject to damage and deterioration at the edges that may strike and rub against conveyor structures and guiding devices in use. In certain aspects my invention consists in a novel method and apparatus for eliminating this defect by holding the belting properly centered at all times and feeding it centrally into the vulcanizing channel so that its two edges will be equally and uniformly covered and finished throughout the entire length of the product.

The improvements comprising my invention reside in method and apparatus for supporting the belting accurately centered and passing it along a substantially straight path to the vulcanizing channel and simultaneously and progressively bending the marginal portions of the belting in said straight path inwardly toward and feeding them into the channel. The apparatus which I herein illustrate and may employ embodies two rolls, one roll having a cylindrical portion with end flanges for conducting the belting in flat condition and properly centered into said straight path and the other roll being disposed in said path and having conical end portions for engaging and bending the marginal edges of the belting inwardly and feeding them into the channel, the contact of the latter roll with the belting being such that it does not substantially distort the body portion of the belting from said straight path. The production of an improved method and apparatus of this nature which substantially eliminates the objections and defects above recited and permits the feeding of the uncured belting into the channel under uniform tension throughout its width comprises a further object of the invention.

Figure 2:
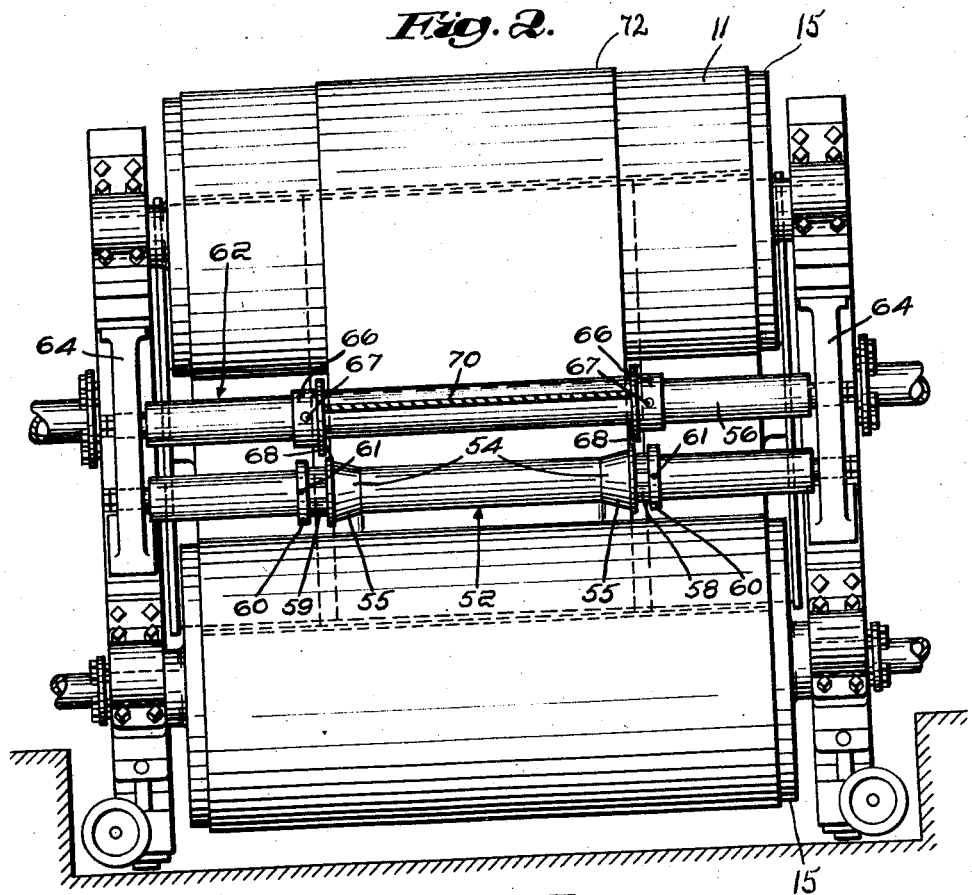
Figure 3:
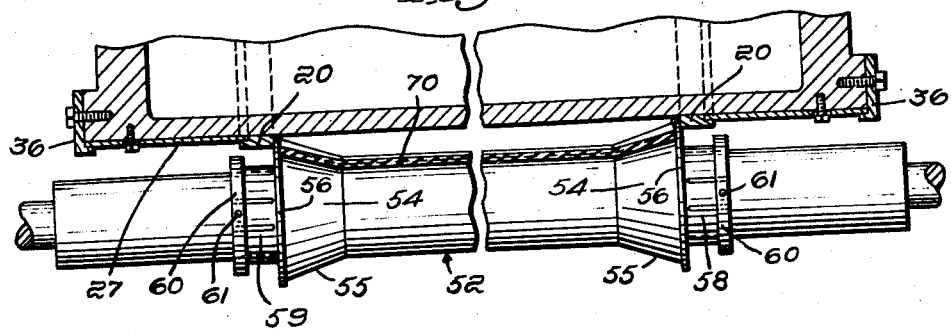

The above and other features of the invention will be best understood and appreciated from the following description of a preferred embodiment of the apparatus selected for purposes of illustration and shown in the accompanying drawing in which, Fig. 1 is a fragmentary side elevation of a machine embodying my invention, Fig. 2 is a front elevation thereof, Fig. 3 is a fragmentary view taken on line 3—3 of Fig. 1.

The vulcanizing machine illustrated in the drawing comprises a heavy metal frame embodying side members 10 of similar shape rigidly connected and supported upon a concrete foundation. The frame is designed to support three rolls over which passes a relatively wide steel tension band 11 in a generally triangular path with a reentrant loop extending about the periphery of a large vulcanizing drum or cylinder 12 supported by the frame within the general outline of the path of the band. The vulcanizing drum 12 is steam heated and cooperating with a relatively large segmental portion thereof is a steam heated jacket 14. Two of the band supporting rolls are located adjacent to and forwardly of the vulcanizing drum at 15 and a third roll (shown in the patent) is located rearwardly of the drum, the tension band being supported on these rolls and engaging the drum or the interposed stock beneath the jacket 14. The band is brought to and held under the desired tension by hydraulic pressure acting against the bearings of the third roll. The drum is rotated slowly in the direction indicated by the arrows and the strip to be vulcanized is fed or drawn into the bite formed between the band and the drum as the band leaves the lower roll 15.

The vulcanizing drum is provided with an open channel extending continuously therearound and bounded on three sides by a bottom wall and two side walls. In the drawings I have illustrated the cylindrical surface of the drum as providing the bottom wall and rings 20 as providing the side walls of this channel. The use of the rings provides for a variation in the width as well as the depth of the channel, the rings being held in place on the drum by spacing plates 27 and end stop plates 36, all as described in the said patent.

The open channel above described provides the bottom and two side walls of a mold and the tension band 11 is arranged to form the top wall thereof. The production of a satisfactory belting furthermore requires that the mold shall be completely filled and the belting brought firmly into intimate contact with the mold walls throughout their entire areas and especially at the side walls which forms the edges of the belting. As illustrated in the drawings, this is accomplished by crowding into the channel uncured belting of a width greater than the width of the channel. The two edges of the belting are first fed into the channel and the intermediate portion is thereafter crowded thereinto by engaging the tension band therewith, the belting being thereupon molded into intimate contact with the side walls. During such feeding of the edges into the channel the intermediate portion of the belting is permitted to bulge outwardly and subsequently the tension band crowds the belting wholly into the channel under heavy pressure and provides the top wall of the mold, whereby enclosing the belting at all four sides. These steps and the vulcanizing of the belting while wholly enclosed and under pressure are furthermore carried out continuously whereby producing a belting uniform in dimensions and character throughout.

In accordance with the construction disclosed in said patent No. 2,179,443 the belting passes for about 90° about and in contact with a roll 52 disposed adjacent to the channel and having conical end portions tapering outwardly to greater dimension and cooperating with the side walls of the channel and adapted to engage and bend the marginal portions of the belting inwardly toward and feed them into the channel. The belting is thus deflected in two directions, viz. both longitudinally and transversely at this arcuate portion of its path, all of which is objectionable for the reasons hereinabove stated.

My improvement contemplates the feeding of the belting along a substantially straight path to the molding channel and progressively bending the marginal portions of the belting inwardly toward the channel in said path as it is being fed into the channel. Apparatus which I herein illustrate and may employ embodies two cylindrical rolls 62 and 52 rotatably mounted at their ends in brackets 64 carried on the frame of the machine. The top roll 62 has two collars 66 secured thereto as by set screws 67 and providing annular flanges 68 for engaging the edges of the uncured belting 70. The collars are spaced apart to provide a supporting and guiding channel therebetween corresponding in width to the uncured belting and in exact alignment with the molding channel in the drum 12. The function of the roll 62 is to direct belting in flat and centered condition thereover and along a substantially straight path therefrom to the molding channel and the roll 62 is so located that this path extends into the bite between the pressure band 11 and the drum and tangentially of the drum.

The roll 52 is disposed beneath the roll 62 and is substantially the same as the corresponding roll shown in the said patent. Mounted on this roll 52 adjacent and opposite to the channel forming rings 20 are two elements 54. These elements have conical surfaces 55 facing each other, flanges 56 extending into the molding channel and respectively in contact with the side walls formed by the rings 20, and outwardly extending sleeve portions 58. The sleeve portions are slitted to provide a flexible leaf 59 integral with each element and a ring 60 surrounding each sleeve portion has a screw 61 threaded thereinto and engaging the leaf 59. Tightening of these screws is adapted to bind the elements against movement relative to the roll 52.

The channel formed by the roll 52 is in alignment with the channels in the roll 62 and the drum 12 and is arranged to engage the same face of the belting that is engaged by the roll 62. The roll 52 is also so disposed relative to the said straight path that the conical surfaces 55 bend the marginal portions of the belting transversely or inwardly toward the molding channel and without substantially distorting the body portion of the belting from said path. It will be apparent that the roll 52, including the two conical elements 54, bows the belting transversely while the belting is in substantially flat condition in said path and I have found that contact of the belting with the roll over an arc of approximately 10° is sufficient to accomplish this function and direct the belting into the molding channel. The longitudinal stress on the belt is thus roughly one ninth that exerted on it by the mechanism disclosed in the Bierre patent and is not sufficient to cause the defects above discussed.

The use and operation of the improvements embodying my invention and the advantages gained are believed to be quite apparent. The uncured belting 70 to be treated is passed in taut condition to and over the roll 62 and from thence along a substantially straight path to the bite between the molding channel in the drum 12 and the tension band 11 as it leaves the lower roll 15. At an intermediate portion of this path the belting is engaged by the roll 52 which bends the marginal portions inwardly toward and feeds them into the molding channel, the intermediate portion of the roll permitting the belting to bulge outwardly as illustrated in Fig. 3. The belting thereupon passes into the bite formed between the tension band and the drum whereupon the tension band engages the bulged portion of the belting and forces it into straight alignment transversely and into the channel. The belting is thus crowded into and completely fills the molding channel, particularly at the side walls, and the band 11 thereupon becomes the top wall of the mold completely enclosing the belting within the channel. The belting, now in vulcanizing contact with the mold on both faces and edges, passes through the vulcanizing path beneath the jacket 14 and is thoroughly and completely vulcanized. The finished belting 72 is somewhat narrower than the uncured belting 70 and its edges are equally and uniformly covered with rubber and uniformly finished throughout the length of the belting.

It is particularly emphasized that in accordance with my improvements the belting is at all times held and fed in centrally disposed position during its passage to and into the molding channel and is bent only in one direction, transversely, when and for the purpose of feeding it into such channel. Thus the resulting product is not only uniformly treated throughout its length and width but furthermore the internal structure of the belting remains wholly intact since it has not been distorted or destroyed during the feeding or treating operations thereon. It will be understood that the belting is originally treated under a considerable tension or condition of stretch and my improvements are particularly adapted to handle the belting in such condition.

Having now disclosed my invention what I claim as new and desire to secure by Letters Patent of the United States is:

1. A machine for shaping and vulcanizing belting or the like, comprising a vulcanizing cylinder having a channel extending continuously therearound and bounded on three sides by a bottom wall and side walls, means for feeding belting to a predetermined point in the channel belting along a substantially straight path disposed between said predetermined point and a location spaced from the channel, means located along said path and cooperating with the side walls for progressively feeding into the channel the two edge portions of the belting while rotating the cylinder and permitting the intermediate portion of the belting to bulge outwardly and without substantially distorting the body portion of the belting from said straight path, and a tension band passing around the cylinder and forming a bite therewith, the band being arranged to crowd the bulging portion of the belting into the channel at and forwardly of said bite and provide a closing top wall for the channel during the passage of the belting therewith through a predetermined vulcanizing path, said predetermined point and said location being disposed at opposite ends of said straight path.

2. A machine for shaping and vulcanizing belting or the like, comprising a vulcanizing cylinder having a channel extending continuously therearound and bounded on three sides by a bottom wall and side walls, means for feeding belting along a substantially straight path to a predetermined point in the channel along a substantially straight path disposed between said predetermined point and a location spaced from the channel, a roller disposed parallel with and adjacent to the cylinder at said path and having an intermediate portion for engaging the belting and end portions tapering outwardly to greater diameter and cooperating with the side walls for engaging the marginal portions of the belting and bending them transversely whereby narrowing the width of the belting and feeding said marginal portions into the channel, the roller being so located that it does not substantially distort the body portion of the belting from said straight path, and a tension band passing around the cylinder and forming a bite therewith, the band being arranged to crowd the bulging portion of the belting into the channel at and forwardly of said bite and provide a closing top wall for the channel during the passage of the belting therewith through a predetermined vulcanizing path, said predetermined point and said location being disposed at opposite ends of said straight path.

3. A machine for shaping and vulcanizing belting or the like, comprising a vulcanizing cylinder having a channel extending continuously therearound and bounded on three sides by a bottom wall and side walls, a roller disposed parallel with and spaced from the cylinder and having a cylindrical portion in alignment with but wider than the channel and end flanges, the roller being adapted to hold belting in alignment with and direct it to the channel along a substantially straight path, a second roller disposed parallel with and adjacent to the cylinder at said path, and having an intermediate portion for engaging the belting and end portions tapering outwardly to greater diameter and cooperating with the side walls for engaging the marginal portions of the belting and bending them inwardly toward the channel whereby narrowing the width of the belting and directing said marginal portions into the channel, the second roller being so located that it does not substantially distort the body portion of the belting from said straight path, and a tension band passing around the cylinder and forming a bite therewith, the band being arranged to crowd the bulging portion of the belting into the channel at and forwardly of said bite and provide a closing top wall for the channel during the passage of the belting therewith through a predetermined vulcanizing path, the first named roller and said bite being at opposite ends of said straight path.

4. A machine for shaping and vulcanizing belting or the like, which comprises a vulcanizing cylinder having a circumferential channel, a roll parallel with and spaced from said cylinder and so disposed as to form one end of a straight path leading at the other end directly into said circumferential channel along a tangent to said cylinder, the cylinder being rotatable to draw a strip of belting to the roll along said path, and means disposed at an intermediate point along said path for engaging and bending inwardly the edges of the belt being fed along said path to said channel.

5. The method of feeding belting into a trough-like channel formed in a rotating vulcanizing drum, which comprises passing the belting along a substantially straight path tangent to the channel, progressively bending the marginal portions of the belting inwardly toward the channel while moving the belting in said straight path and as it is being fed into the channel, thereby narrowing the width of the belting sufficiently to feed its edge portions into the channel, and thereafter crowding the intermediate portion of the belting into the channel and its edge portions outwardly into contact with the side walls progressively and continuously as the belting is fed into the channel.

6. The method of feeding belting into a trough-like channel formed in a rotating vulcanizing drum, which comprises supporting the belting taut and in a predetermined position at a point spaced from the channel, passing the belting from said point along a straight path tangent to the channel, progressively bending the marginal portions of the belting transversely following its passage from said point and while moving it in said straight path as it is being fed into the channel, thereby narrowing the effective width of the belting sufficiently to feed its edge portions into the channel, and thereafter crowding the intermediate portion of the belting into the channel and its edge portions outwardly into contact with the walls of the channel progressively and continuously as the belting is fed into the channel.

7. The method of feeding belting into a continuous trough-like channel formed in a rotating vulcanizing drum, which comprises passing the belting about a cylindrical roller and from thence along a substantially straight path tangent to the channel, progressively bending the marginal portions of the belting inwardly toward the channel following its passage over the roller and while moving the belting in said straight path, thereby narrowing the width of the belting sufficiently to feed its edge portions into the channel, and thereafter crowding the intermediate portion of the belting into the channel and its edge portions outwardly into contact with the side walls progressively and continuously by engaging a top wall with the intermediate portion of the belting as the belting is fed into the channel.

8. The method of feeding belting into a continuous trough-like channel formed in a rotating vulcanizing drum which comprises passing the belting in taut condition over and with one face supported in contact with a cylinder corresponding in length to the width of the belting and then along a substantially straight path tangent to the channel, progressively bending the marginal portions of the belting transversely by engaging the moving belting along said straight path between the cylinder and drum with a roller having an intermediate substantially cylindrical portion in contact with said face and end portions tapering outwardly to greater diameter, thereby narrowing the effective width of the belting sufficiently to feed its edge portions into the channel, and thereafter crowding the intermediate portion of the belting into the channel and its edge portions outwardly into contact with the side walls progressively and continuously by engaging a top wall with the intermediate portion of the belting as the belting is fed into the channel.

GROSVENOR D. MARCY.

REFERENCES CITED

The following references are of record in the file of this patent:

UNITED STATES PATENTS

| Number | Name | Date |
| --- | --- | --- |
| 1,500,679 | Midgley | July 8, 1924 |
| 2,358,176 | MacDonald | Sept. 12, 1944 |
| 2,159,543 | Baker | May 23, 1939 |
| 2,179,443 | Bierer | Nov. 7, 1939 |
| 2,179,444 | Bierer | Nov. 7, 1939 |
| 1,054,748 | Cook | Mar. 4, 1913 |